(12) United States Patent
Mallila

(10) Patent No.: US 7,424,026 B2
(45) Date of Patent: Sep. 9, 2008

(54) METHOD AND APPARATUS PROVIDING CONTINUOUS ADAPTIVE CONTROL OF VOICE PACKET BUFFER AT RECEIVER TERMINAL

(75) Inventor: Jani Mallila, Oulu (FI)

(73) Assignee: Nokia Corporation, Espoo (FI)

( * ) Notice: Subject to any disclaimer, the term of this patent is extended or adjusted under 35 U.S.C. 154(b) by 894 days.

(21) Appl. No.: 10/834,328

(22) Filed: Apr. 28, 2004

(65) Prior Publication Data

US 2005/0243846 A1 Nov. 3, 2005

(51) Int. Cl.
*H04L 12/28* (2006.01)
*H04L 12/56* (2006.01)

(52) U.S. Cl. ................ 370/413; 370/412; 370/414; 370/415; 370/416; 370/417; 370/418; 370/517; 370/230; 370/231; 370/232; 370/470

(58) Field of Classification Search ............. None
See application file for complete search history.

(56) References Cited

U.S. PATENT DOCUMENTS

| 6,377,931 B1 | 4/2002 | Shlomot ............ 704/503 |
| 2003/0167170 A1* | 9/2003 | Andrsen et al. ........ 704/270 |
| 2003/0202528 A1* | 10/2003 | Eckberg ............ 370/412 |

FOREIGN PATENT DOCUMENTS

WO   WO-00/42749 A1   7/2000
WO   WO 02/087137 A2   10/2002

OTHER PUBLICATIONS

Wayman et al., "Some Improvements on the Synchronized-Overlap-Add Method of Time Scale Modification for Use in Real-Time Speech Compression and Noise Filtering", IEEE Transactions on Acoustics, Speech, and Signal Processing, vol. 36, No. 1, Jan. 1988, pp. 139-140.

(Continued)

*Primary Examiner*—Raj K Jain
(74) *Attorney, Agent, or Firm*—Harrington & Smith, PC

(57) ABSTRACT

Disclosed is a device, a computer program and a method to receive and buffer data packets that contain information that is representative of time-ordered content, such as a voice signal, that is intended to be presented to a person in a substantially continuous and substantially uniform temporal sequence; to decode the information to obtain samples and to buffer the samples prior to generating a playout signal. The samples are time scaled as a function of packet network conditions to enable changing the play-out rate to provide a substantially continuous output signal when the data packets are received at a rate that differs from a rate at which the data packets are created. The time scaling operation operates with a base delay that is controlled in a positive sense when the data packets are received at a rate that is slower than a rate at which the data packets are created, and a reserve delay that is managed to provide insurance against an interruption should the base delay become negative.

45 Claims, 11 Drawing Sheets

OTHER PUBLICATIONS

Verhelst et al., "An Overlap-Add Technique Based on Waveform Similarity (WSOLA) for High Quality Time-Scale Modification of Speech", IEEE 0-7803-0946-4/93, pp. 11 554-11 557.

Ramjee et al., "Adaptive Playout Mechanisms for Packetized Audio Applications in Wide-Area Networks", IEEE 0743-166X/94 1994, pp. 5d.3.1-5d.3.9.

Liang et al., "Adaptive Playout Scheduling Using Time-Scale Modification in Packet Voice Communications", Information Systems Laboratory, Dept. of Electrical Engineering, Stanford University, Stanford, CA 94305, 4 pgs, 2001.

Stenger et al., "A New Error Concealment Technique for Audio Transmission with Packet Loss", Telecommunications Institute, University of Erlangen-Nuremberg, Cauerstrasse 7, 91058, Erlangen, Germany, 4 pgs, 2001.

Laoutaris, N. et al., "Adaptive Playout Strategies for Packet Video Receivers with Finite Buffer Capacity", © 2001 IEEE, pp. 969-973.

Liang, Y.J. et al., "Adaptive Playout Scheduling and Loss Concealment for Voice Communication Over IP Networks", © 2003 IEEE, pp. 532-543, Dec. 2003.

Shallwani, A. et al., "An Adaptive Playout Algorithm with Delay Spike Detection for Real-Time VoIP", © 2003 IEEE, May 2003, pp. 997-1000.

* cited by examiner

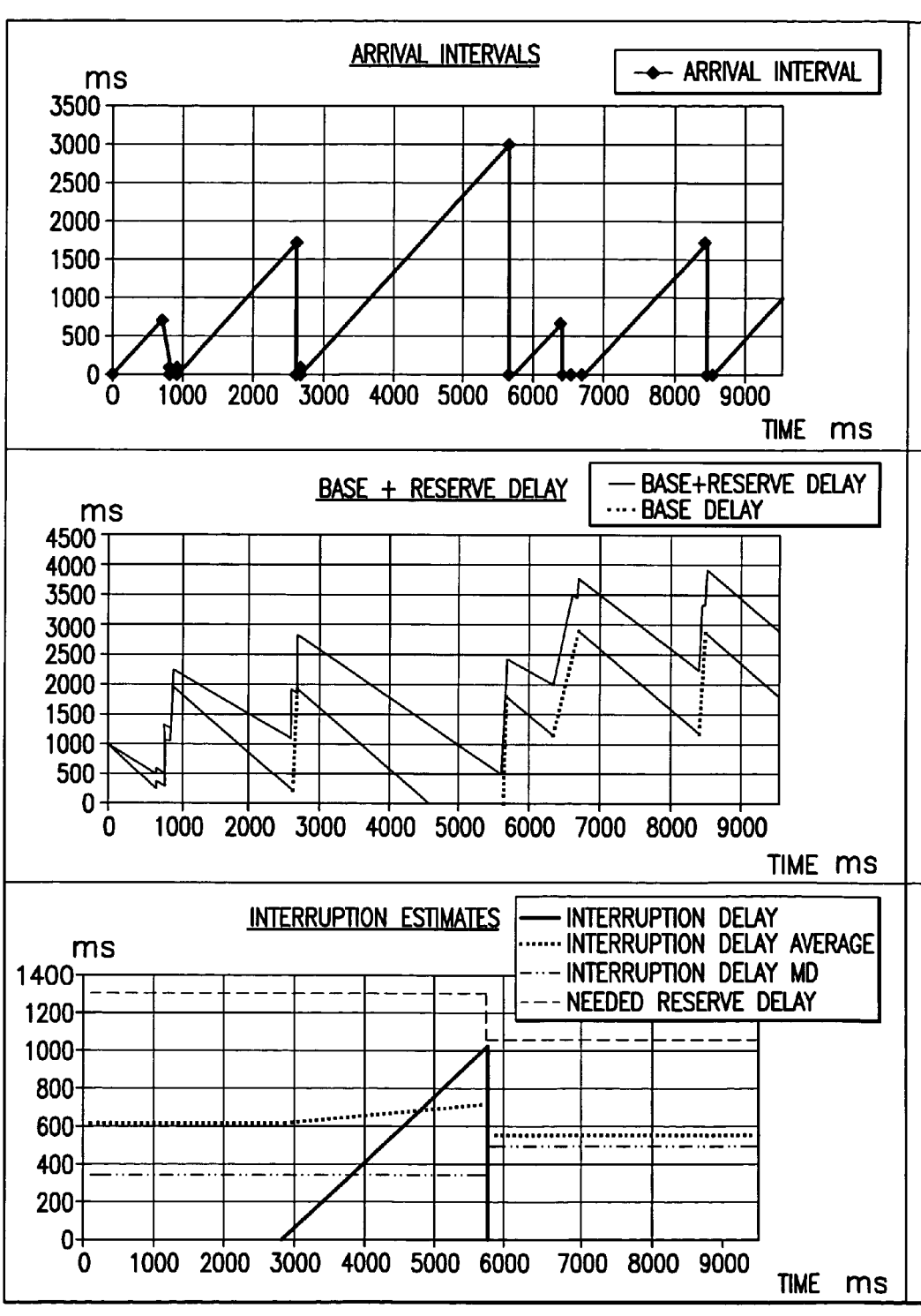

METHOD AND APPARATUS PROVIDING CONTINUOUS ADAPTIVE CONTROL OF VOICE PACKET BUFFER AT RECEIVER TERMINAL

CROSS-REFERENCE TO A RELATED PATENT APPLICATION

This patent application is related to commonly assigned U.S. patent application Ser. No. 10/696,252, filed on Oct. 29, 2003, entitled "Method and Apparatus Providing Smooth Adaptive Management of Packets Containing Time-Ordered Content at a Receiving Terminal", by Jani Mallila, the disclosure of which is incorporated by reference herein in its entirety.

TECHNICAL FIELD

This invention relates generally to telecommunications devices and terminals and, more specifically, relates to terminals that are connected to packet switched networks, and that are capable of receiving voice-containing data packets, such as during a VoIP (Voice over Internet Protocol) call. Although described primarily in the context of receiving and playing out voice-containing packets, this invention applies as a well to packets containing video information, and in general to packets that convey time-ordered content that is intended to be presented to a listener or a viewer in a substantially continuous and substantially uniform temporal sequence (i.e., in a manner that is substantially free of interruptions and discontinuities). Voice content and video content are two primary, but non-limiting, examples of time-ordered content.

BACKGROUND

In packet switched systems, such as the General Packet Radio System (GPRS) wireless system, the uncertainty due to variations in data packet arrival times can have a significant impact on system performance. Reasons for the variation in packet arrival times include congestion of network resources and route variations between successive packets. When the packets contain voice data, as in a VoIP system, in order to obtain a continuous voice output the buffering depth, or buffering delay, at the data packet receiver should be proportional to the variations in packet arrival times.

A conventional fixed initial delay data buffer can remove the variations to some extent. It is, however, very likely that the network conditions will vary depending on congestion of network resources, the location of the receiving terminal and the specific implementation of the network components. With conventional (fixed delay) buffering it is impossible to react to changing network conditions. In addition, when the throughput is consistently low it is impossible to prevent receiver buffer underflows.

For these reasons some type of adaptive buffer control needs to be introduced if optimal operation is desired in terms of buffering delay and minimal interruptions in output voice. The buffer control should be capable of changing the buffering delay in as smooth a manner as possible. Stated another way, it is most desirable if the change of buffering delay is done with the same ratio over longer intervals, than if the buffering delay is first decreased, then increased, and then decreased again, and so on over short intervals.

At least two prior art buffer control techniques have required accurate knowledge of the network end-to-end delay: Ramjee R. (1994), "Adaptive Playout Mechanisms for Packetized Audio Applications in Wide-Area Networks", in IEEE INFOCOM '94, The Conference on Computer Communications Proceedings, 12-13 June, Toronto, Vol. 2. pp. 680-688, Canada; and Liang Y. J. (2001), "Adaptive Playout Scheduling Using Time-Scale Modification in Packet Voice Communications", in IEEE International Conference on Acoustics, Speech, and Signal Processing Proceedings, 7-11 May, Salt Lake City, Vol. 3, pp 1445-1448. However, to accurately obtain the end-to-end delay would require the use of synchronized clocks at the sending and receiving terminals, and thus is currently not possible to accurately obtain with most commercially available terminals.

Another technique has been proposed that does not require this type of information: Telefonaktiebolaget LM Ericsson. "Adaptive Jitter Buffering", WO 00/42749. This approach attempts to estimate network conditions over a fixed sampling interval. While this approach may have some use when pauses or delay spikes (an interruption is considered to be the amount of time the buffer is empty or, more exactly, would have been empty if no time scaling had been introduced) occur at relatively short intervals, if the interval between successive pauses is greater than the sampling interval then there can be cases where no pause will occur during one of the sampling intervals. From this it follows that the control mechanism will decrease the buffering delay, as opposed to the situation where the pause would have occurred. If the pause occurs during the next sampling interval it causes an undesired pause in speech due to buffer underflow. After the speech interruption the buffering delay is increased once again during the following sampling interval. As can be appreciated, this type of operation can readily lead to the situation where the buffering delay is decreased/increased/decreased and so on by the control mechanism, resulting in unnecessary fluctuations in the playout rate. In addition, some fixed number of packets must be accumulated before performing the buffering delay change (sampling interval). This results in a slower reaction time when packets arrive at a reduced rate, and potentially increases the possibility of interruptions in speech output because the buffering delay is increased only after the sampling interval. In the approach of WO 00/42749 the change in the buffer delay is accomplished by discarding or delaying packets, where more specifically the change is made during a silent period by adding or removing speech frames containing silence. However, adding or removing only silence leads to changes in the time relationship between silent periods and speech periods, which can result in unnatural sounding very long or very short silences between sentences and possibly also between words. The duration of the silent periods can vary from sentence to sentence, or from word to word, and therefore can result in an unnatural rhythm to the speech.

In general, the adaptive buffer control should be applied only when it is needed. The situation in a packet switched network may well be such that the packets arrive in bursts, and between each burst there is a long (perhaps several seconds) delay. This is not a problem if the long-term arrival interval average is the same as the rate at which the packets were created. This means only that the physical buffer size should be long enough at the receiver side to accommodate the variations. However, in the design of the adaptive buffer control this should be considered, since the play-out rate of voice should not annoyingly fluctuate if the buffering delay fluctuates.

It can thus be appreciated that the current approaches to dealing with the variability of arrival times of data packets containing voice or video signals are not satisfactory, and do not adequately address the problems inherent in providing natural sounding voice in VoIP and other types of data packet-based network systems.

In the above-cited commonly assigned U.S. Patent Applications a buffer control approach uses estimates of the interruption of packet arrival. While well suited for use in many network environments, in some highly dynamic environments, such as an Enhanced Data rates for GSM Evolution (EDGE) environment where speech packets arrives in a bursty manner, the use of a different type of buffer control mechanism can be more optimum. For example, in this type of network packets representing two seconds of speech can arrive during a very short interval, after which there may be a two second pause in the arrival of speech-containing packets.

SUMMARY OF THE PREFERRED EMBODIMENTS

The foregoing and other problems are overcome, and other advantages are realized, in accordance with the presently preferred embodiments of these teachings.

An aspect of this invention is based on the realization that in spite of long pauses, a listener does not experience discontinuities in an audio signal, such as speech, if the overall arrival rate of audio signal samples is the same as the rate at which the audio signal was created. Thus, and in accordance with this invention, instead of measuring pauses between packet arrivals, it is preferred instead to measure interruptions that would have occurred in the playout of the audio signal if no reserve delay would have been introduced, and to base the packet buffer control at least in part on this measurement.

Stated differently, a goal of this invention is not to measure the interruption delay in output speech (i.e., the interruption that is heard by the listener), as that delay depends on the amount of reserve delay that existed before the pause in packet arrivals. Instead, it is preferred to measure the interruption delay that would have been heard if no reserve delay was introduced, and in this way one can determine how much reserve delay is needed to cover the average interruption delay.

If the speech is slowed according to a slow packet arrival rate, then this modification affects the base delay (because a base offset is used) and therefore in that case the discontinuity in output speech is prevented if the arrival interval average is at most about two times the packet creation interval.

Disclosed is a device, a computer program and a method to receive and buffer data packets that contain information that is representative of time-ordered content, such as a voice signal, that is intended to be presented to a person in a substantially continuous and substantially uniform temporal sequence, to decode the information to obtain samples and to buffer the samples prior to generating a playout signal. The samples in each frame are time scaled as a function of packet network conditions to enable changing the play-out rate to provide a substantially continuous output signal when the data packets are received at a rate that differs from a rate at which the data packets are created. The time scaling operation operates with a base delay that is controlled in a positive sense when the data packets are received at a rate that is slower than a rate at which the data packets are created, and a reserve delay that is managed to provide insurance against an interruption should the base delay become negative.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The adaptive buffer control mechanism described below can be used whether the signal of interest is speech, music, some other type of audible signal, or a video signal, or in general any time-ordered signal. Therefore, while the term voice is used in this disclosure, the use of the term voice should not be construed as implying only a human utterance.

In general, the adaptive buffer control should affect a voice signal only when there is a need. This concept correlates to other error correction methods, which operate only if an error or errors have occurred. The situation in packet switched networks may well be such that the packets are arriving as bursts, and between each burst there is a long (for example, several seconds) delay. This does not present a problem if the long-term arrival interval average corresponds to the rate at which voice packets are generated, and implies only that the physical buffer size should be large enough at the receiver side to accommodate the variations. However, in the design of an adaptive control system this should be considered, because the playout rate of voice should not fluctuate annoyingly if the buffering delay fluctuates.

A software-based adaptive control entity requires either a hardware or a software based clock, since the arrival times of packets are needed. It would be simplest to implement this clock as a counter that is incremented at voice frame intervals. However, if more exact timing is desired then the clock should be implemented as a more precise software counter or as a hardware clock. In the following discussion a software counter is considered, but this is not a limitation on the practice of this invention. Also, it is assumed that the voice packets are sequence numbered at the sender, so that the relative creation times of packets can be determined in accordance with the sequence numbers.

Figure 1:
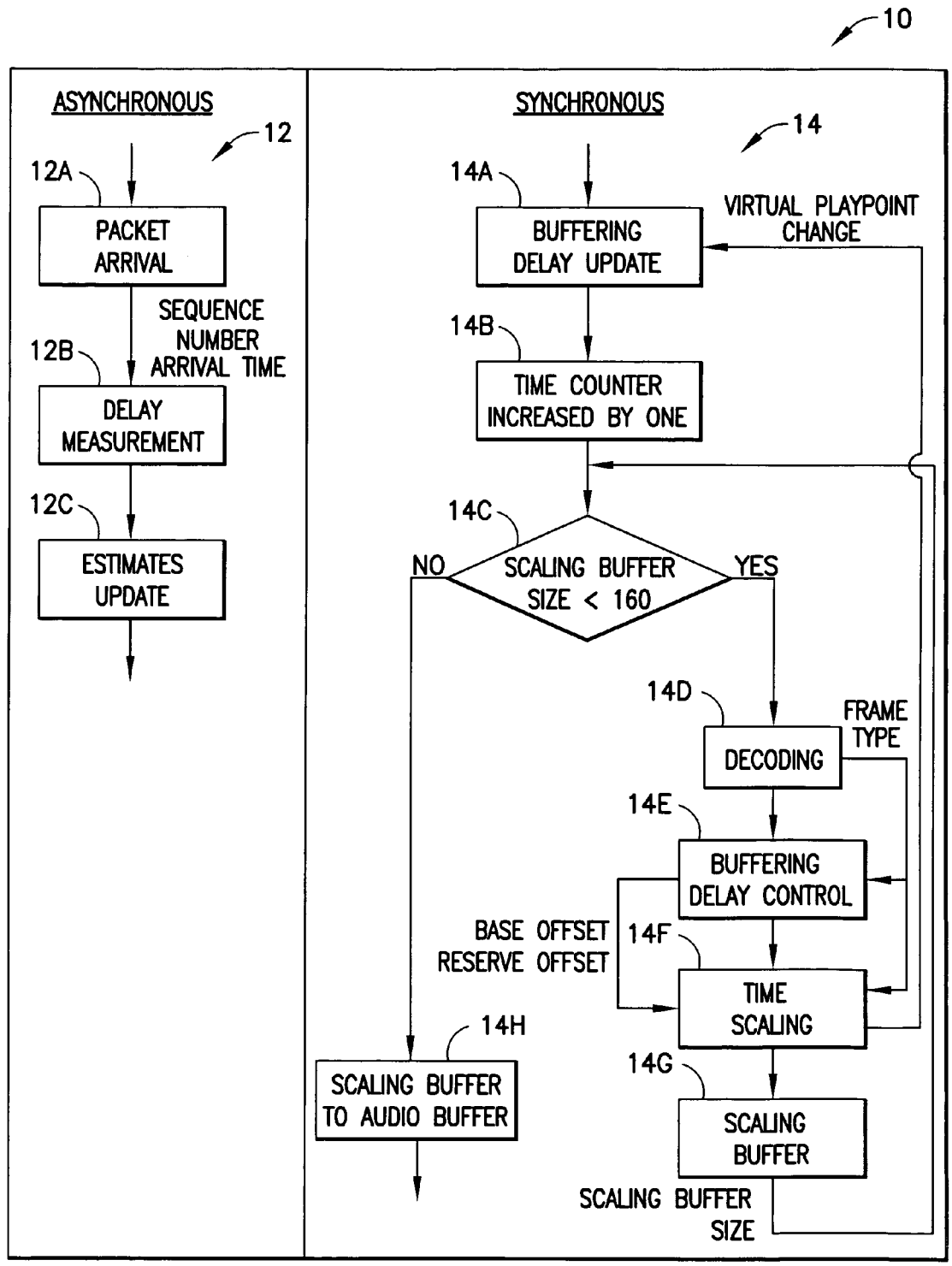
FIG. 1 is system block and process flow diagram that illustrates a high level description of the adaptive buffer delay control in accordance with this invention.

FIG. 1 is a logic flow diagram of the adaptive buffer control technique in accordance with this invention. In FIG. 1 the buffering delay is considered to be the difference between a packet's playout point (the playout time instant of the first frame in the packet) and the arrival time of the packet. The goal is to adjust the buffering delay according to two separate parameters: (a) the arrival interval of packets and (b) interruptions. The buffering delay is therefore considered to be a combination of two components: base delay and reserve delay.

The base delay is herein considered to be the amount of buffering delay that is introduced due to the arrival rate of packets. If packets arrive faster than they are created, and the packets are played out at the same rate as they are created, then the base delay increases. The base delay is controlled by justifying the playout of packets according to their average arrival interval. The reason why the packets are not played-out faster than created is that it is very likely that, due to the fast arrival, at some point a network buffer underflow occurs and causes a pause in packet arrival that is seen at the receiver terminal. The base delay that was introduced during the time that the packets arrived in a rapid manner can then be used during such a pause, and no interruption in the voice signal is audible to the listener. If, on the other hand, the packets arrive at a rate slower than the rate at which they are created then the playout interval of the packets is increased relative to the average arrival interval so that the base delay remains positive. Otherwise, a slow arrival rate would result in discontinuities in speech. The base delay is preferably evaluated for the last frame of a packet with a largest sequence number of the session.

The reserve delay is herein considered to be the additional delay that is used in anticipation of, and as insurance against, interruptions. An interruption is considered to occur when the base delay goes negative, which means that the base delay for the last frame of the packet with largest sequence number of session has been consumed, and an interruption delay is therefore defined to be the amount of time that the base delay stays negative. The interruption is not heard if the reserve delay is sufficient to cover the interruption delay.

The playout of voice frames is preferably started immediately after the second voice packet has arrived. The second packet can be delayed so that the reaction to a slow link can be accommodated, and therefore the initial delay is embedded into the base delay and not the reserve delay. During a voice session the reserve delay is modified to cover the average duration of interruptions. In the preferred embodiment this is accomplished by modifying the playout intervals of packets by using time scaling of the voice signal.

As is shown in FIG. 1, the adaptive control method and system 10 has two component parts: an asynchronous part 12 and a synchronous part 14. These are now described.

Asynchronous 12:

The asynchronous part 12 is so named because it operates only as a packet arrives. As the packet arrives it is placed in a packet buffer 12A and at 12B the arrival interval for the packet is measured. If an interruption has occurred then the interruption delay is also measured. According to these measurements the estimates (interruption delay, arrival interval) are updated at 12C.

Synchronous 14:

The estimates of the arrival interval and interruption delay (from block 12C) are used in the control of the buffering delay. The components of the buffering delay are updated at 14A, after which the time counter is increased by one (block 14B), which therefore corresponds to the duration of one voice frame. The time counter is used when the arrival intervals, interruption delay and the buffering delay components are measured. The base delay is controlled according to the arrival interval average so that the buffer does not underflow, even if the packets arrive slower than created. On the other hand, the reserve delay is maintained sufficiently large so as to cover the interruption delays. The control system is involved in time scaling by determining the base and reserve offsets, which both affect the playout rate of packets. From the offsets the time scaling ratio is evaluated: 1.00+base offset+reserve offset. The time scaling ratio is the ratio between the scaled and the original signal lengths. If the time scaling ratio is limited between 0.5 and 2.0, then the number of decodings can be 0, 1 or 2 times for the interval of one voice frame. Following the loop of blocks 14C, 14D, 14E, 14F and 14G, after each decoding the samples are time scaled and stored in a scaling buffer 14G. The loop of decoding and time scaling is performed until there exists at least 160 samples in the scaling buffer 14G, after which the oldest 160 samples in the scaling buffer 14G are transferred to an audio buffer 14H for further processing. It can be noted that 160 samples corresponds to a 20 ms voice frame (e.g., AMR or GSM voice frames) when the voice signal is sampled at 8,000 Hz (8,000 Hz*0.02 s=160). The entire adaptive process is therefore transparent for any audio processing that takes place after it. In a preferred embodiment the maximum size that is reserved for the scaling buffer 14G is 480 samples (or three voice frames), although more or less than three voice frames could be accommodated.

Buffer underflow occurs if there are no packets in the packet buffer 12A and the system is waiting for the next packet to arrive. Underflow of the packet buffer 12A therefore delays the playout point of the next packet, and it can be considered as lengthening the signal by time scaling (inserting voice frames). Buffer overflow occurs when the packet buffer 12A is full, and the oldest packet needs to be overwritten by the newest packet to arrive. In this case the playout of some packets may be skipped so that packet synchronization can be maintained. Skipping over packet sequence numbers can be considered as a shortening of the signal by time scaling as voice frames are removed.

The result of time scaling or buffer underflows or overflows is that the packets are played out at irregular intervals. For simplicity, it is preferred that all end-to-end delay changes are embedded within one variable that is defined as the virtual playout point. In essence, the virtual playout point is the playout point that should have been used for the first packet of a session, if the remainder of the packets would have been played out at steady intervals, while still resulting in the same end-to-end delay as with the actual, irregular playout of packets.

The type of voice frame may be a good frame, a bad frame (missing), or a wait frame (read sequence number is not increased). A wait frame can occur either when there are no frames in packet buffer 12A, or when there are frames in the packet buffer 12A but the playout of the first frame in the packet buffer 12A is delayed. For a wait frame it is preferred to play comfort noise. The type of the voice frame is needed when deciding whether a given frame can be time scaled or not. Time scaling is performed only if the type of the frame is a good frame. It is preferred not to time scale bad and wait frames since these frames represent discontinuities in the voice signal.

A more detailed description of the construction and operation of certain of the blocks shown in FIG. 1. With regard to the delay measurement block 12B, the arrival interval is measured using the following equation:

$$\text{arrival interval} = \text{current time} - \text{previous arrival time}, \quad (1)$$

where the previous arrival time is the arrival time of a previous packet.

In the case of interruption the interruption delay is measured:

$$\text{interruption delay} = \text{current time} - \text{previous play time}, \quad (2)$$

where the previous play time is the time at which the previous frame, and therefore the last frame before interruption, would have been played if no reserve delay had been introduced.

Figure 2:
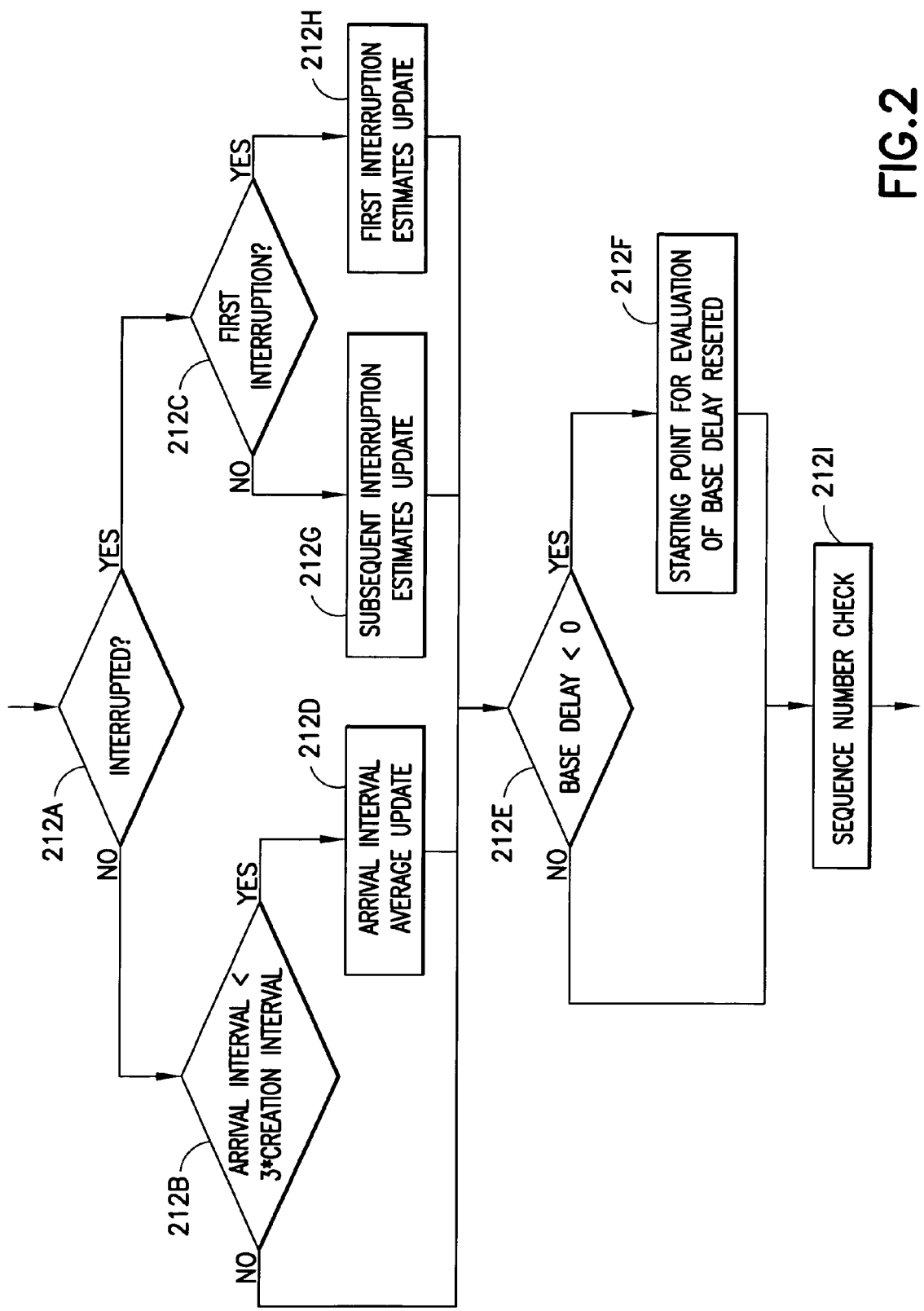
FIG. 2 is system block and process flow diagram that illustrates the estimates update block of FIG. 1.

Reference is now made to FIG. 2 for a description of the construction and operation of the estimates update block 12C of FIG. 1. It is first noted that there are two distinct main cases when updating estimates. The first case is when the function is called if interruption has not occurred (block 212A transitions to block 212B). In this case the arrival interval average is updated (block 212D) if the arrival interval is less than three times the packet creation interval (as determined at block 212B). There are two main reasons why the arrival interval average is not updated if the pause between packet arrivals is at least three times the packet creation interval. The first reason is that in the preferred embodiment the scaling ratio is limited as a maximum to 2.00. Therefore, an arrival interval average that is greater than two times the packet creation interval has no effect. The second reason is that the voice packets may arrive in bursts. In this regard it is clear that the arrival interval average is low during a burst. However, when there is long pause between packet arrivals, then the arrival interval average should not be updated, otherwise it temporarily become greater than the actual arrival interval average and, thus, result in an unnecessary scaling of the signal.

The second estimate updating case is when an interruption has occurred (block 212A transitions to block 212C). Interruption delay estimates (blocks 212G, 212H) are preferably updated by using exponential averaging. The first interruption of a session (as determined by block 212C) is estimated separately from the subsequent interruptions. This is preferably done because the first interruption is the most likely one to occur in every session. Therefore, the estimate of the first interruption delay is preferred to be known more precisely so that the probability of hearing the discontinuity due to the first interruption can be reduced.

In both of these cases a check is made to determine if the base delay is negative (block 212E) and if it is then the starting point for evaluating the base delay (refer to Eq. 7 below) can be reset (block 212E transitions to block 212F). This is done by setting the first sequence number for the base delay to the sequence number of an arrived packet, the base virtual playpoint to the current time, and the base delay to be equal to the creation interval minus one. This ensures that the measurement of the base delay is correctly performed by the Eq. 7 that is shown below. The arrived sequence number is checked at block 212I, and if it is less than the first sequence number for the base then that parameter is updated to that of the sequence number of the packet that has arrived. On the other hand, if the arrived sequence number is larger than the currently largest arrived sequence number, then that parameter is also updated. In this manner it is ensured that the base delay measurement also functions when packets arrive in disorder. The base delay can go negative in the case of an interruption, and also if the base delay has been negative but the arrival interval is less than three times the creation interval. In this case it is not deemed as interruption, but rather a slow arrival rate.

It is important to note that the arrival interval average does not correspond to the actual arrival interval average, because the interruptions and pauses are not taken into account. As a result, it may be considered to reflect the arrival interval average between interruptions or pauses. The reason why the arrival interval average is not updated during pauses was discussed in the description of FIG. 2. The reason why it is not updated when interruption has occurred is that in this way the two issues that affect the behavior of the buffering delay are separated, i.e., the arrival interval average of packets when the link is on, and the delay introduced by interruptions when the link goes temporarily down for a period of time sufficient for the packet buffer 12A to underflow, if no reserve delay had been introduced. This has been found to correspond well to the nature of packet switched networks for which it is typical that the arrival interval average most likely is close to what it was before an interruption or a pause occurred.

Still referring to FIG. 2, and more particularly the arrival interval average update block 212D, the arrival interval average is preferably updated only when no interruptions or pauses have occurred. As the first packet arrives the arrival interval average is set equal to the creation interval. For subsequent packets the average is updated by using exponential averaging as follows:

$$\text{arrival interval average}_{i+1} = 0.125 * \text{arrival interval} + 0.875 * \text{arrival interval average}_i. \quad (3)$$

Eqs. (4) and (5) are used for updating both the first and subsequent interruptions (blocks 212H and 212G, respectively). First a determination is made whether the interruption delay estimates should be initialized. The estimates are initialized if the interruption delay average is zero. If initialized, then the interruption delay average is set to the measured interruption delay and the mean deviation is set to zero. If not initialized, then the estimates are updated by using exponential averaging as follows:

$$\text{interruption delay average}_{i+1} = 0.25 * \text{interruption delay} + 0.75 * \text{interruption delay average}_i, \text{ and} \quad (4)$$

$$\text{interruption delay } MD_{i+1} = 0.25 * |\text{interruption delay} - \text{interruption delay average}| + 0.75 * \text{interruption delay } MD_i, \text{ where } MD \text{ is the Mean Deviation.} \quad (5)$$

When an interruption occurs and the interruption average is not zero, but the mean deviation is zero, then the mean deviation is initialized as follows:

$$\text{interruption delay } MD = |\text{interruption delay} - \text{interruption delay average}|/2. \quad (6)$$

In this manner the mean deviation converges more rapidly to a valid value if the initial value is zero.

It is considered likely that the environment does not change significantly between successive sessions, and therefore the interruption delay estimates may be used to advantage in the following session. However, if no interruption occurs during a session, then the average is preferably halved so that eventually it will converge to zero. The variance is set to zero immediately. In this way it is ensured that if the conditions improve then the estimates will correspond to this behavior. The session should be long enough for the divide by two operation to occur, and in this manner the average is not halved purposelessly for short sessions where it is unlikely than an interruption could have occurred. The length of a valid session, after which the halving of both the first interruption and the subsequent interruption delays can take place, can be, for example, about five seconds.

Figure 3:
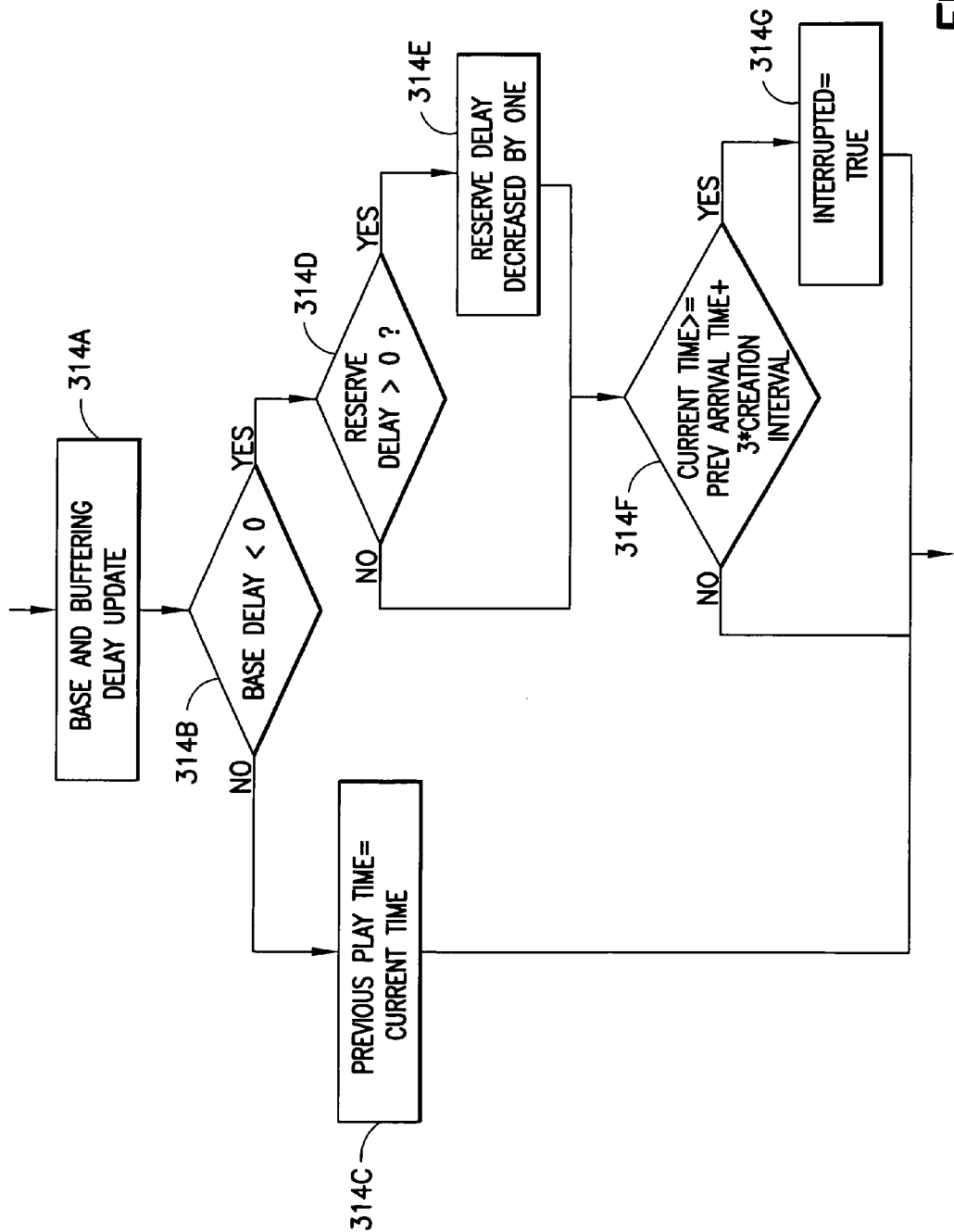
FIG. 3 is system block and process flow diagram that illustrates the buffering delay update block of FIG. 1.

Reference is now made to FIG. 3 for a description of the construction and operation of the buffering delay update block 14A of FIG. 1.

It is first noted that the buffering delay per se is not used, rather its components (base and reserve) are used. Therefore it is not necessary to calculate the buffering delay. However, if one desires to check the overall integrity of the process then the buffering delay may be calculated and compared to the sum of its components.

The base delay is evaluated for the last frame of the packet with the largest sequence number so far arrived during the session. For simplicity, it is preferred that all base delay modifications that are related to the arrival interval average are embedded within one variable that is defined as the base virtual playpoint. In essence, the base virtual playpoint is the playout point that should have been used for the first arrived packet in the current evaluation period of the base delay, if the remainder of the packets would have been played out at regular intervals, while still resulting in the same base delay as with the actual, irregular playout of packets. In other words the base virtual playpoint is the time at which the first sequence number for the current evaluation period of the base delay should have been played so that Eq. (7) can be used to calculate the delay for forthcoming packets. As was discussed above with regard to FIG. 2, the evaluation period of the base delay begins at the time instant where the first packet arrives after the base delay has gone negative.

The base virtual playpoint is first updated by simply adding the virtual playpoint change to the current base virtual playpoint value. After this update the virtual playpoint change is set to zero.

The base delay represents an amount of time that a last voice frame of a packet with a largest sequence number thus far arrived in the session would have to wait in the packet buffer 12A before playout, if there would be no reserve delay:

$$\text{base delay} = \text{base virtual playpoint} + \text{creation interval} * (\text{largest arrived sequence number} - \text{first sequence number for the base}) + \text{creation interval} - 1 - \text{current time}. \quad (7)$$

After Eq. 7 is solved in block 314A, a determination is made at block 314B as to whether the base delay has gone negative. If it has not, control passes to block 314C where the previous play time is made equal to the current time. However, if the base delay has gone negative then control passes to block 314D where the reserve delay is tested to determine if it is greater than zero, and if it is control passes to block 314E to decrement the reserve delay. In this manner the reserve delay is consumed when the base delay is negative. Control then passes to block 314F where a determination is made as to whether the current time is equal to or greater than the previous packet arrival time plus three times the packet creation interval. If this is true, then an interruption is detected at block 314G, otherwise the delay is considered to be due to a slow arrival rate and therefore it has an effect on the arrival interval average estimation. For pauses less than three times creation interval, the scaling according to the arrival interval average will prevent the determination of the occurrence of an interruption.

Figure 4:
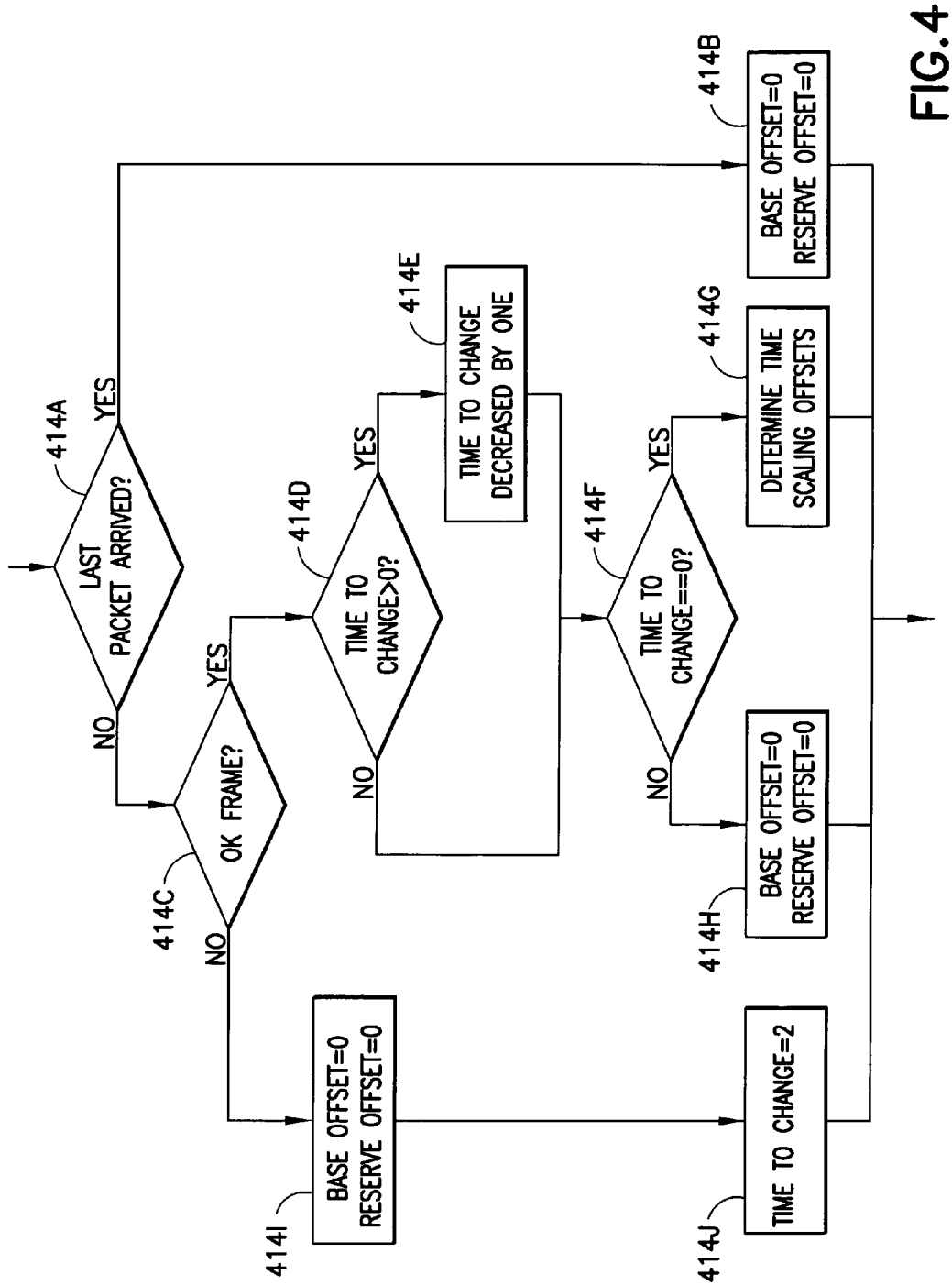
FIG. 4 is system block and process flow diagram that illustrates the buffering delay control block of FIG. 1.

Reference is now made to FIG. 4 for a description of the construction and operation of the buffering delay control block 14E of FIG. 1, which operates to manage the high level control of the buffering delay. The time scaling ratio is the sum of three components: 1.00+base offset+reserve offset. This corresponds to concept of controlling the base delay relative to the arrival interval average, and the reserve delay relative to average interruptions. If it is known that the last packet for a packet stream has arrived (for example one or more trailer packets have arrived), then there is no need to modify the playout rate of the voice signal and therefore both the base and reserve offsets are set to zero (block 414A transitions to block 414B). Otherwise, if the last packet has not arrived the type of decoded frame determines the actions to be performed next.

At block 414C, if the frame from the packet buffer 12A is received correctly, then control passes to block 414D to determine whether the time to change counter should be decreased by one, and if needed this is performed at block 414E. Next a determination is made as to whether the time to counter has been decremented to zero, which would mean that the scaling offsets could be changed as determined in block 414G, as discussed below in relation to FIG. 5, otherwise the base offset and the reserve offset are set to zero in block 414H. Returning to block 414C, in the case that there are frames in the buffer, but the next frame is not found, then the frame is considered to be a bad frame. In the case that there are no frames at all in the buffer, then the frame type is declared to be a wait frame. In both of these cases the base and reserve offsets are set to zero in block 414I and the time to change counter is set to a value of two in block 414J. In this case the system waits for two frames after the last discontinuity, as time scaling may not operate in an optimal manner if it is done for a voice signal that contains discontinuities.

Figure 5:
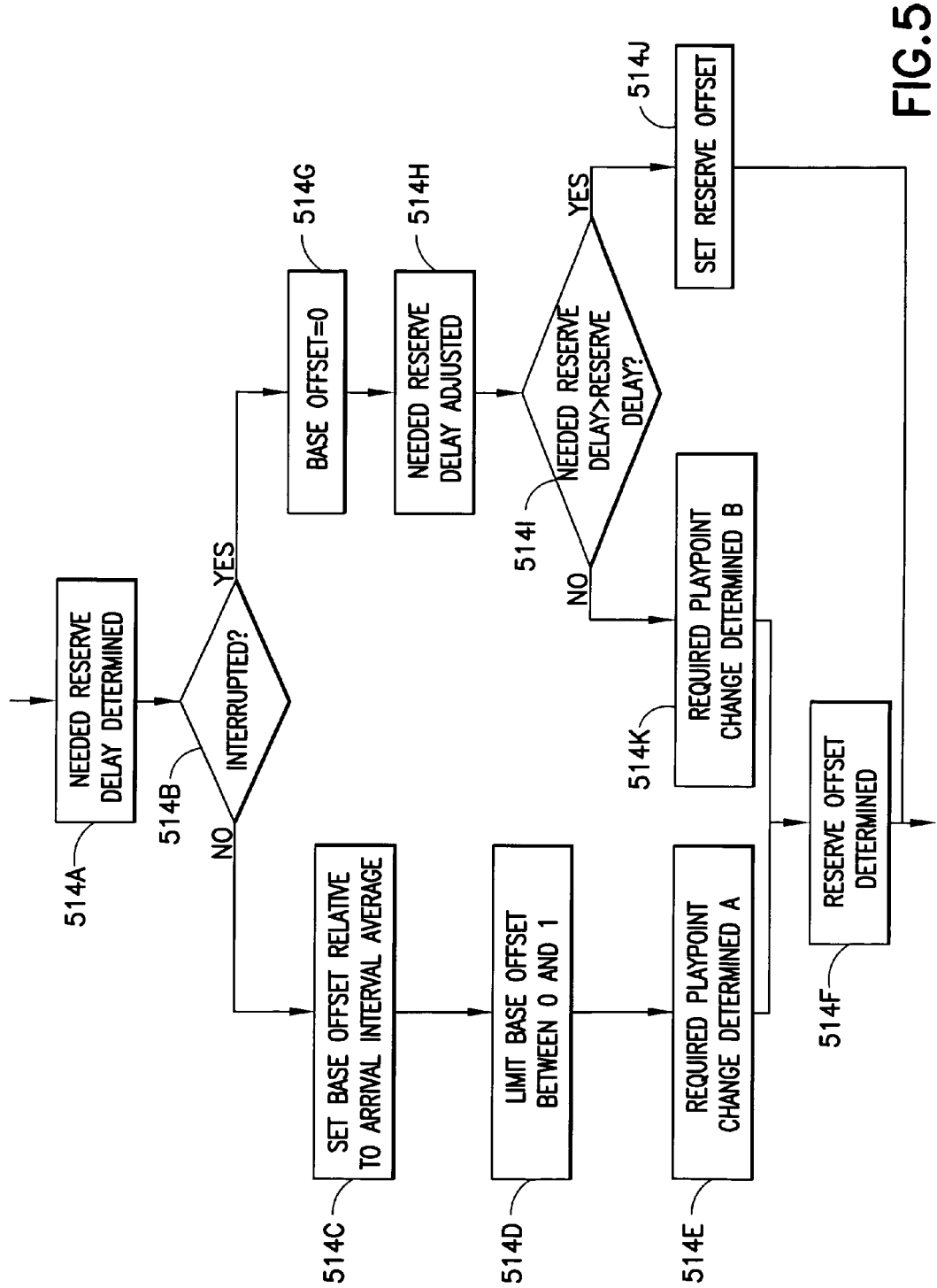
FIG. 5 is system block and process flow diagram that illustrates the determine time scaling offsets block of FIG. 4.

Reference is now made to FIG. 5 for a description of the construction and operation of the determine time scaling offsets block 414G of FIG. 4. The time scaling offsets are used when the actual time scaling ratio is set. The time scaling ratio is a sum of three components: 1.00+base offset+reserve offset. It is presently preferred to allow time scaling ratios between 0.5 and 2.00, so that the playout rates sound natural to the listener.

The system first determines at block 514A the needed amount of reserve delay so that the next interruption can be compensated. Because the first interruption is separated from the others, the required amount of reserve delay also depends on whether the first interruption has occurred. More specifically, if the first interruption has not occurred then the needed (required) reserve delay is:

$$\text{needed reserve delay} = \text{first interruption delay average} + B * \text{first interruption delay } MD, \text{otherwise:} \quad (8)$$

$$\text{needed reserve delay} = \text{interruption delay average} + C * \text{interruption delay } MD. \quad (9)$$

In equations (8) and (9) the value of the constants B and C is a compromise between guarding and end-to-end delay. For example, a reasonable value for B may be two, and for C a reasonable value may be one. In this way there would be more guarding towards the first interruption, which occurs during most sessions. The way in which the time scaling offsets are determined depends on whether the session has been interrupted or not.

If interruption has not occurred, control passes to block 514C to set the base offset relative to the arrival interval average, then to block 514D to apply a limit to the base offset (between 0 and 1), then to block 514E where the required playpoint change is determined. Finally, control passes to block 514F to determine the reserve offset.

As was discussed above, the base delay is considered to be the amount of buffering delay that is introduced due to the arrival rate of packets. Thus, at block 514C the base offset that controls the base delay is set relative to the arrival interval average:

$$\text{base offset} = (\text{arrival interval average}/\text{creation interval}) - 1. \quad (10)$$

The above Eq. (10) is used only if the arrival interval average is greater than the creation interval. If the arrival interval average is less than the creation interval, then the base offset would be negative. In such a case it is, however, very likely that a pause will follow due to buffer underflow at the network side and, therefore, the playout rate should not be increased. For this reason the base offset is set to zero if the arrival interval average is less than the creation interval. The base offset is preferably upper limited to the value of one (block 514D). By using the base offset obtained by Eq. (10) the underflow of the buffer can be prevented (if there are no interruptions and the arrival interval average is not greater than about two times the creation interval), because the packets are not played out faster than the rate at which they on average arrive.

To make the reserve delay converge towards the desired value, the reserve offset that depends on the amount of the required playpoint change is evaluated. The required playpoint change (A) is determined in block 514E by:

$$\text{required playpoint change} = \text{needed reserve delay} - \text{reserve delay}. \quad (11)$$

The above Eq. (11) is used only if the reserve delay is greater than zero, otherwise the required playpoint change is set to zero. This is done since if the reserve delay is negative then it is indicated that the buffer has previously overflowed (because the reserve delay is decreased by the number of frames that are skipped due to buffer overflow), and increasing the reserve delay would just increase the possibility of further overflows.

By using the required playpoint change the reserve offset is adjusted at block 514F so that it is in relationship to the need. Table 1 illustrates how the amount of required playpoint change affects the reserve offset adjustment. When the conditions of the two first rows are met, then the reserve offset is set according to the value below them. The first row makes the reserve offset dependent on the amount of need, and the second row ensures that the combination of reserve and base offsets will always be at a maximum of 1.00, thus upper limiting the time scaling ratio to 2.00. For example if the needed playpoint change is nine frames, and the base offset is 0.875, then the reserve offset is set to 0.125.

TABLE 1

Reserve offset according to needed playpoint change

| Required playpoint change >= | negative | 0 | 1 | 8 | 16 |
|---|---|---|---|---|---|
| Base offset <= | Any | Any | 0.875 | 0.75 | 0.5 |
| Reserve offset | −0.125 | 0 | 0.125 | 0.25 | 0.5 |

A description is now made of how the scaling ratio is determined if the session has been interrupted (the yes path from the decision block 514B). First, the base offset is set to zero in block 514G. This corresponds to the concept that the interruptions and arrival interval average are compensated separately. Next, at block 514H the needed reserve delay is adjusted:

$$\text{needed reserve delay}_{i+1} = \text{needed reserve delay}_i - (\text{current time} - \text{previous play time}). \quad (12)$$

By using Eq. (12), from the needed reserve delay is subtracted the duration that the interruption has lasted thus far. In some cases the needed reserve delay can be negative after equation (12) is solved, and for this reason the value is lower limited to zero. Next, at block 514I a determination is made as to whether the needed reserve delay is greater than the current reserve delay. If it is then there is still a need to increase the reserve delay for the current interruption, and the reserve offset is set as follows:

$$\text{reserve offset} = (\text{needed reserve delay}/\text{reserve delay}) - 1 + D. \quad (13)$$

By using the constant value D it is possible to more rapidly achieve the needed reserve delay. A reasonable value for D is 0.25. The Eq. (13) is used only if reserve delay is greater than zero, otherwise the reserve offset is set to one. The reserve offset is upper limited to one so that the maximum time scaling ratio is two.

If the current reserve delay is equal or greater than needed reserve delay then there is no need to increase the reserve delay for the current interruption. However, the system can begin to accumulate the reserve delay for the next interruption. First, a determination is made of how much reserve delay already exists for the next interruption:

$$\text{reserve for next} = \text{reserve delay} - \text{needed reserve delay}. \quad (14)$$

The needed amount of reserve delay for the next interruption is then evaluated:

$$\text{needed reserve delay next} = \text{interruption avg} + C*\text{interruption } MD. \quad (15)$$

Now, the required playpoint change (B) is determined at block 514K as:

$$\text{required playpoint change} = \text{needed reserve delay next} - \text{reserve for next}. \quad (16)$$

After this the procedure described in Table 1 is used to determine the reserve offset (at block 514F). In that the system is prepared for the next interruption while the current interruption is still occurring, more protection is introduced also against the current interruption. If after the current interruption all of the reserve delay has not been used, then the residual reserve delay may be used for the next interruption.

Figures 6, 7:
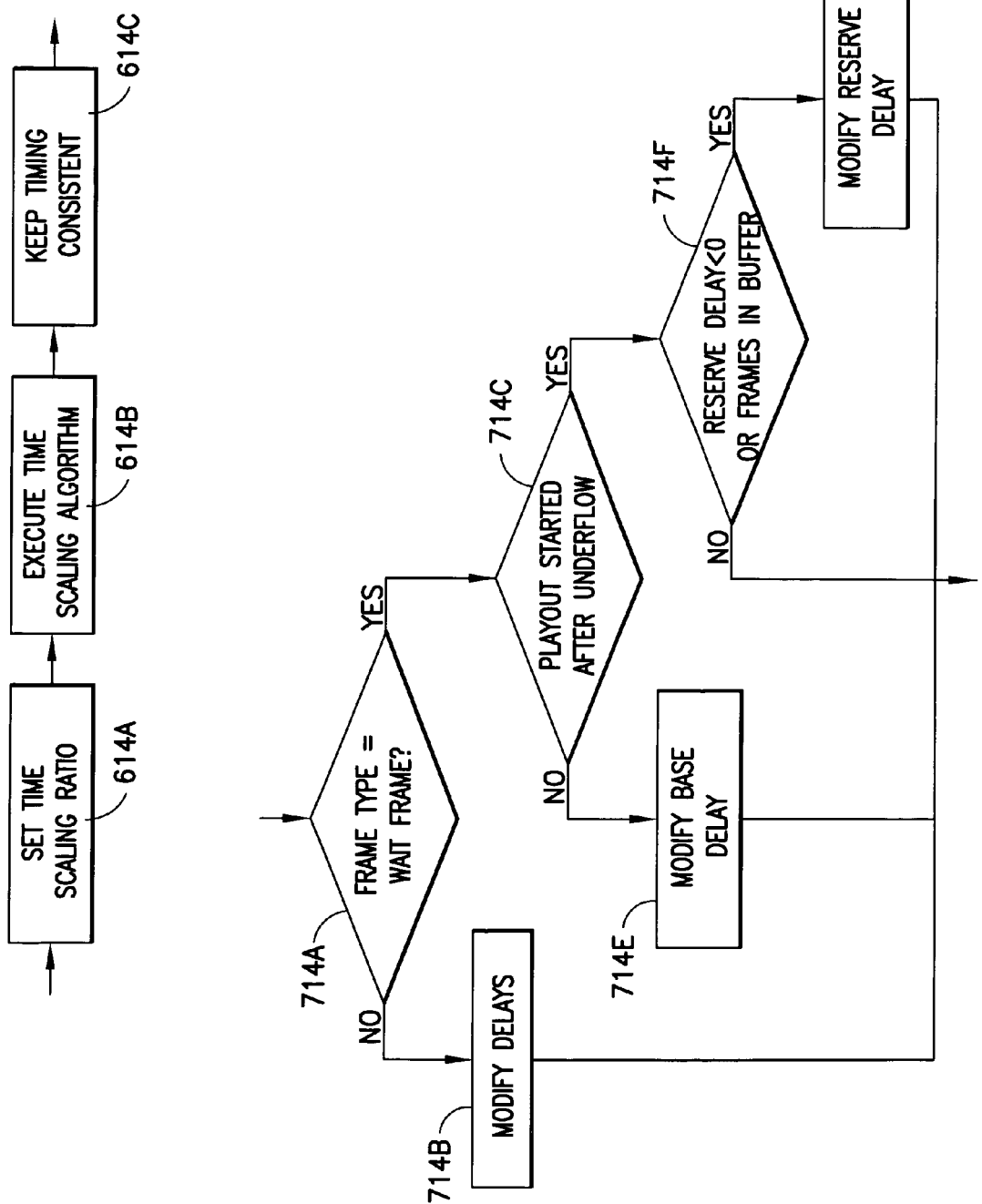
FIG. 6 is system block and process flow diagram that illustrates the time scaling block of FIG. 1.
FIG. 7 is system block and process flow diagram that illustrates the timing consistency block of FIG. 6.

Reference is now made to FIG. 6 for a description of the construction and operation of the time scaling block 14F of FIG. 1. A suitable time scaling algorithm is used for this process and, in general, the time scaling is an implementation specific issue. Non-limiting examples of suitable time scaling algorithms can be found in: "Some Improvements on the Synchronized-overlap-add Method of Time Scale Modification for Use in Real-time Speech Compression and Noise Filtering", Wayman J. L, IEEE Transactions on Acoustics, Speech and Signal Processing, January, Vol. 36, pp. 139-140 (1988); "An Overlap-add technique Based on Waveform Similarity (WSOLA) for High Quality Time-scale Modification of Speech", Verhelst W., IEEE International Conference on Acoustics, Speech, and Signal Processing, 27-30 April, Minneapolis, Vol. 2, pp. 554-557, USA (1993); or "A New Error Concealment Technique for Audio Transmission with Packet Loss", Stenger A., European Signal Processing Conference, Trieste, 10-13 September, pp. 1965-1968. Italy (1996).

Prior to calling the time scaling algorithm in block 614B, the time scaling ratio is set in block 614A as follows:

$$\text{Time scaling ratio} = 1.00 + \text{base offset} + \text{reserve offset}. \quad (17)$$

Due to the time scaling operation, at block 614C the timing is kept consistent (discussed below in regards to FIG. 7). If the type of decoded frame was a wait frame or a bad frame then it is passed through the time scaling algorithm block 614B using the ratio 1.00.

After each call of the time scaling algorithm in block 614B the output samples are copied to the scaling buffer 14G. When the time scaling is called for the last time for the current 20 ms interval, the oldest 160 samples in the scaling buffer 14G are moved to the audio buffer 14H for further processing (see FIG. 1, block 14H).

Reference is now made to FIG. 7 for a description of the construction and operation of the timing consistency block 614C of FIG. 6. In order to maintain consistent timing the following actions are taken. First, at block 714A a determination is made as to whether the decoded frame was a wait frame. If it was not then delays are modified at block 714B. The introduced samples for the base and reserve delays are as follows:

$$\text{base scaled samples}_{i+1} = \text{base scaled samples}_i + 160 * \text{base offset; and} \quad (18)$$

$$\text{reserve scaled samples}_{i+1} = \text{reserve scaled samples}_i + 160 * \text{reserve offset.} \quad (19)$$

Next, the change for the reserve delay can be taken into account as integer number of frames:

$$\text{reserve delay change} = int(\text{reserve scaled samples}/160), \quad (20)$$

where int=integer, $$\text{reserve delay}_{i+1} = \text{reserve delay}_i + \text{reserve delay change}. \quad (21)$$

The amount of reserve scaled samples not accounted for is:

$$\text{reserve scaled samples}_{i+1} = \text{reserve scaled samples} - \text{reserve delay change} * 160. \quad (22)$$

For the base delay the change is embedded into the base virtual playpoint:

$$\text{base delay change} = int(\text{base scaled samples}/160); \text{ and} \quad (23)$$

$$\text{base virtual playpoint change}_{i+1} = \text{base virtual playpoint change}_i + \text{base delay change}. \quad (24)$$

The amount of base scaled samples not accounted for is:

$$\text{base scaled samples}_{i+1} = \text{base scaled samples}_i - \text{base delay change} * 160. \quad (25)$$

At block 714A, if the frame is determined to be a wait frame the read sequence number was not increased, and it therefore moves the playout point of the next sequence number one frame onwards.

A determination is then made at block 714D to determine if playout has been initiated after the previous buffer underflow. If playout has not been started after the previous buffer underflow, and the next packet has arrived, then the base delay is not yet consumed and therefore the wait frame moves the base delay's virtual playpoint ahead in time (block 714E). In this case the base virtual playpoint is increased by one.

If playout has been started, then control instead passes to block 714F where a determination is made to determine if one of the following conditions is true: IF the reserve delay is negative, OR if there is at least one frame in the buffer. If the reserve delay is negative, it indicates that the buffer overflowed during the session. From this overflow it then follows that the buffer underflows, and the time during which the buffer underflows will cause the negative reserve delay to increase towards zero. This is therefore taken into account by increasing the reserve delay by one for each wait frame (Block 714G). The other situation is that even though there are frames in the buffer, the frame is not extracted from the buffer. This situation can occur when the packet stream is resynchronized. Also in this case, the reserve delay is increased by one at Block 714G.

Figure 8:
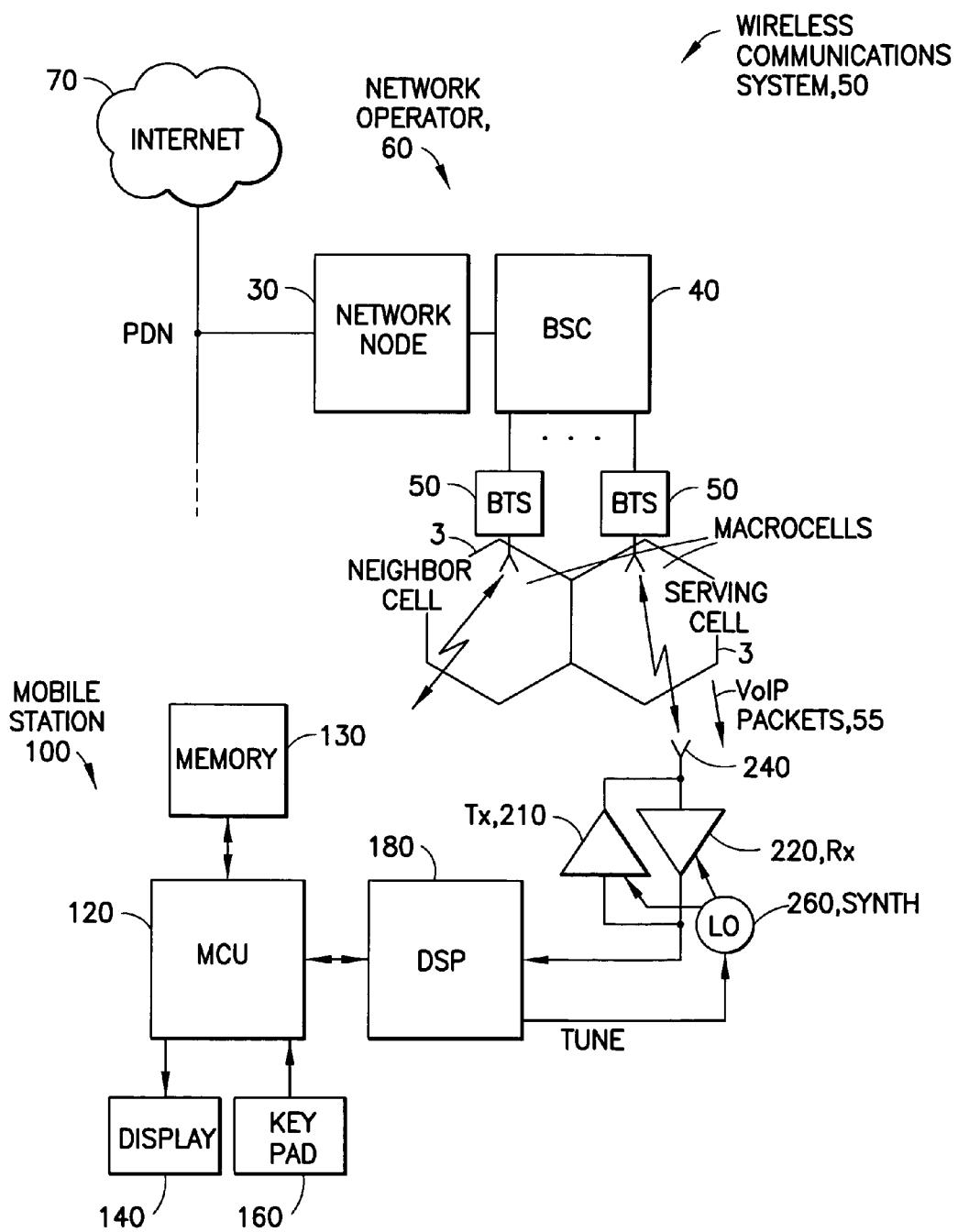
FIG. 8 is a simplified block diagram of a mobile station and wireless network that is one suitable embodiment for practicing the invention shown in FIGS. 1-7.

FIG. 8 shows a simplified block diagram a non-limiting embodiment of a wireless communications system 50 that is suitable for practicing this invention. The wireless communications system 50 includes at least one mobile station (MS) 100. FIG. 8 also shows an exemplary network operator 60 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is one that enables a VoIP functionality to be realized by the MS 100, and thus IP packets arriving from the Internet 70 are assumed to contain voice signal samples for playback at the MS 100 (i.e., VoIP packets 55). However, and as was noted previously, the arriving IP packets may contain other information, such as music, or video information, or in general any time-ordered content where the playout rate of the content can be modified.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. The operating program is assumed, for the purposes of this invention, to enable the MCU 120 to execute the software routines, layers and protocols required to implement the adaptive voice play-out and buffering methods in accordance with this invention, as well as to provide a suitable user interface (UI), via display 140 and keypad 160, with a user. Although not shown, a microphone and speaker are typically provided for enabling the user to conduct voice calls in a conventional manner and, in accordance with this invention, to enable the voice signals from the audio buffer 14H of FIG. 1 to be played out to the user of the MS 100.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized speech data as well as packet data, are transmitted and received through the antenna 240.

The various blocks described in reference to FIGS. 1-7 may be variously implemented in hardware, in software or in a combination of hardware and software. In a preferred embodiment the various buffers, such as the packet buffer 12A, the scaling buffer 14G and the audio buffer 14H are implemented using locations in the memory 130, under the control and management of the MCU 120, and the various functional blocks, such as the Decoding, Buffering Delay Control and Time Scaling blocks 14D, 14E and 14F, respectively, are implemented by the MCU 120 while executing program instructions read from the memory 130. However, it should be noted that in some embodiments the overall adaptive control function (including voice signal modifications) may be implemented using the DSP 180.

Based on the foregoing description it should be appreciated that one advantage of the use of this invention is that the possibility of interruptions in the voice signal can be significantly decreased as compared to traditional buffering techniques. With traditional buffering the introduced buffering delay may be unnecessarily large, or on the other hand too small, in certain situations. Therefore, with traditional buffering the perceived voice quality becomes a compromise between the introduced buffering delay and the actual experienced interruptions in output voice. By using the adaptive buffer control technique of this invention, this compromise can be avoided. With the adaptive buffer control in accordance with this invention only a necessary amount of buffering delay is introduced, as the buffering delay is made a function of the arrival interval of packets and the interruptions in playout of the packets' contents.

The adaptive voice buffering and play-out control made possible by the use of this invention affects the playout signal only when there is a need. This concept correlates well with error correction methods in general, which typically operate only when an error has occurred. While the voice play-out may be slower or faster than the original when the average throughput of the arriving packets is not ideal, this is, however, less annoying to the listener than constant interruptions in the output voice.

The adaptive voice buffering and play-out control made possible by the use of this invention employs exponential estimations, as opposed to using the sampling interval as in some prior art approaches. Thus, it is possible to make decisions with a temporal resolution of one voice frame (e.g., 20 ms) as opposed to a resolution of one sampling interval, thereby providing tighter and more accurate control. The estimation of interruption delays enables maintaining continuous voice output in environments where the intervals between successive interruptions is relatively long.

By way of a summary, and as was described in detail above, the base delay is the component of buffering delay that is introduced due to arrival rate of packets. The base delay is controlled according to the arrival interval average. If packets arrive faster than they are created then the packets are played out at the same rate as they are created, and therefore the base delay gradually increases. It is preferred that the packets are not played faster than they are created since it is very likely that due to the fact that the packets are arriving faster than they are created, at some point a network buffer underflow will occur and result in a pause in packet arrivals at the receiver terminal. The base delay that was accumulated during the period of the rapidly arriving packets may then be used during the pause, and no interruption is heard if the total amount of the base delay covers the pause. If, on the other hand, the packets arrive slower than they are created then the playout interval of the packets is increased so that the base delay does not go negative, which would be eventually experienced as an interruption in the playout signal.

The reserve delay is the additional component of buffering delay that is used as insurance against interruptions. An interruption is considered to occur when the base delay goes negative. The interruption delay is therefore defined to be the amount of time that the base delay stays negative. The interruption is not heard, however, if the reserve delay covers the period of the interruption. The playout of voice frames is preferably initiated immediately after the second voice packet has arrived. The arrival of the second voice packet is waited for so that the reaction to a slow link can be performed and, therefore, the initial delay is embedded into the base delay, and not the reserve delay. During a voice session the reserve delay is modified so as to cover the average duration of interruptions. This is accomplished by modifying the playout intervals of packets by using time scaling of the voice signal.

What follows now are two examples of the use of this invention. In these examples it is assumed that one packet includes eight, 20 ms speech frames, and therefore the creation time between successive packets is 160 ms (8*20 ms).

Figure 9A:
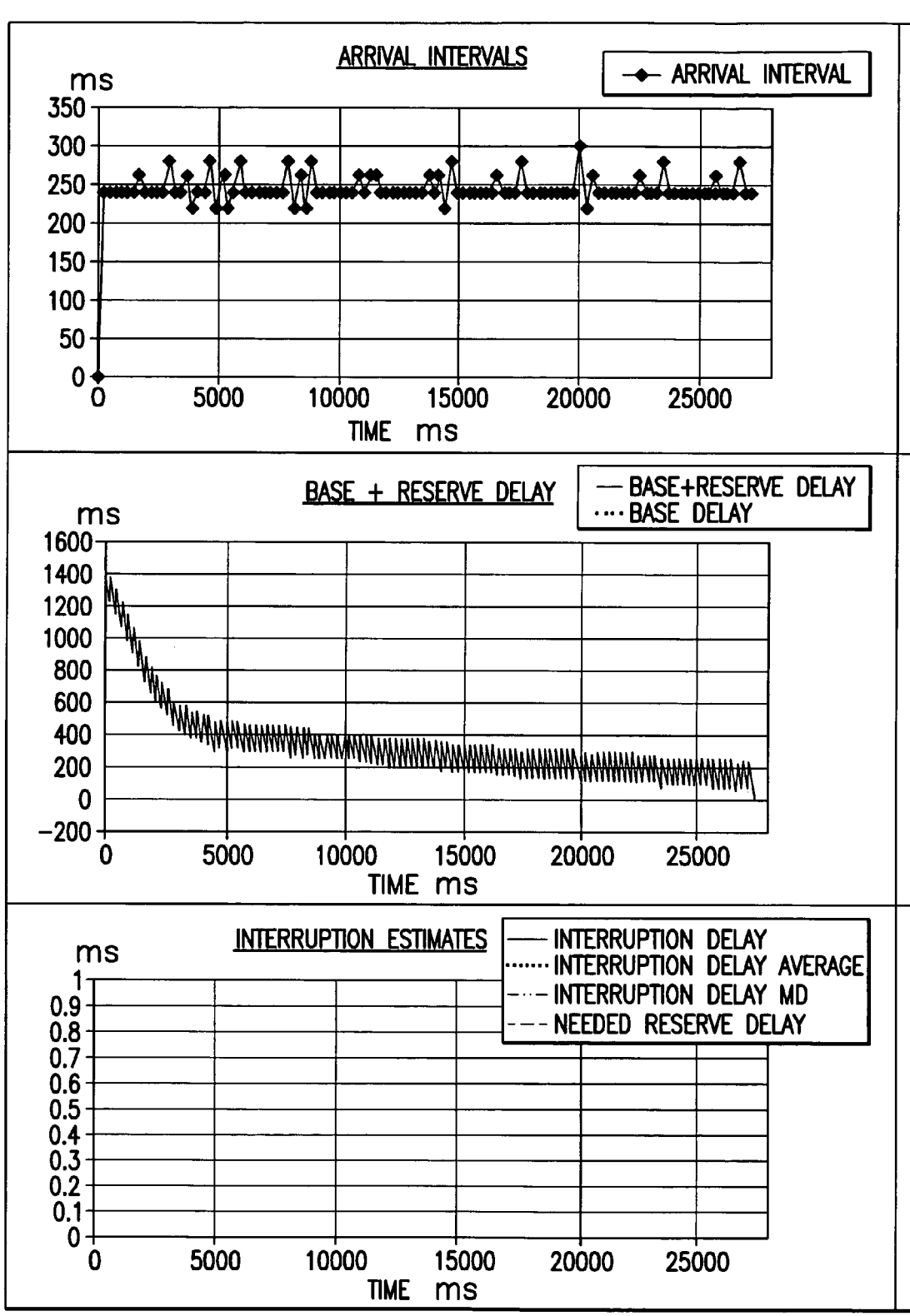
FIG. 9 shows a set of graphs that are useful in explaining a first example of the use of this invention, specifically an example of base delay control with a fast start followed by a slow link.
Figure 9B:
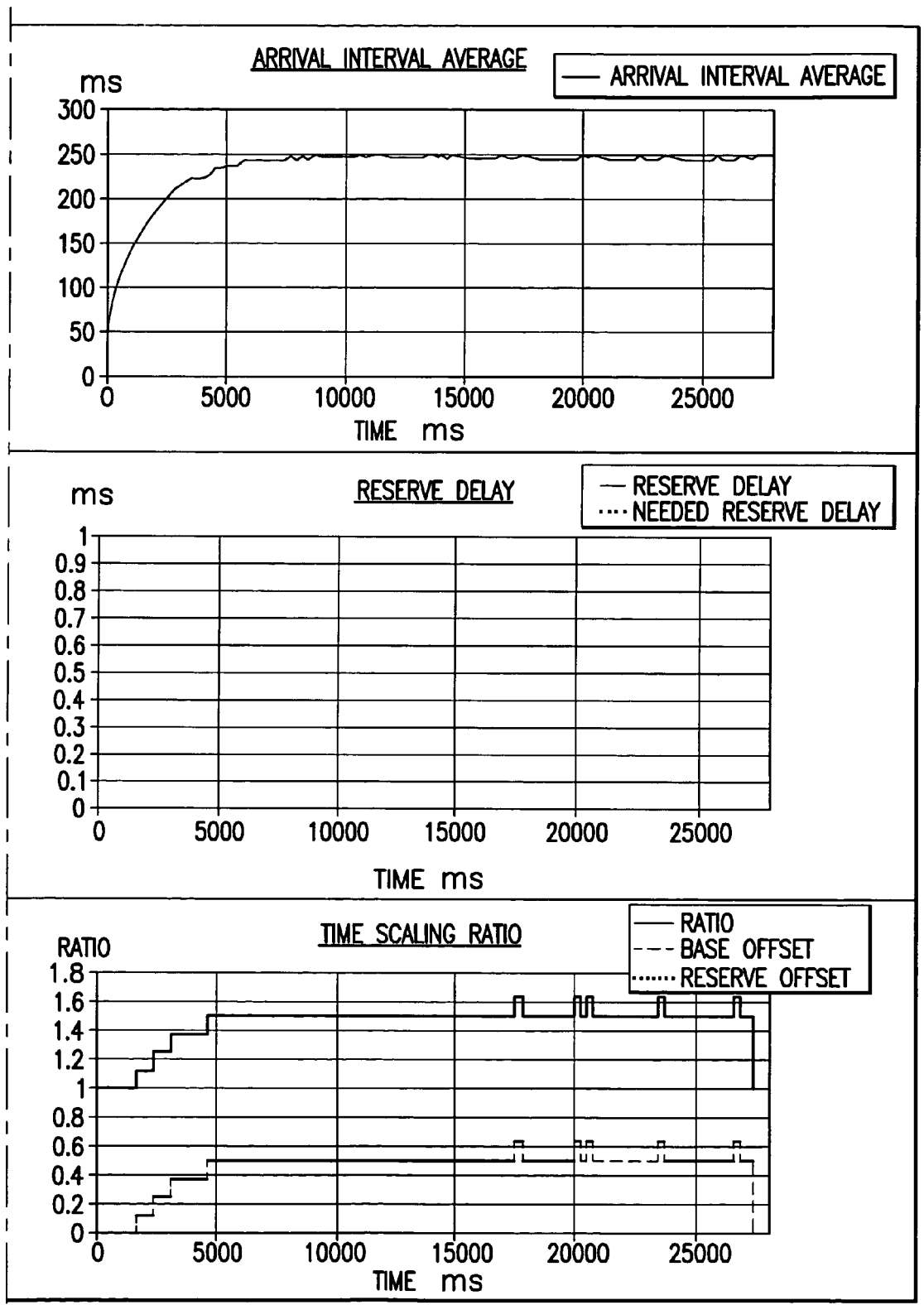

Example of Base Delay Control: Fast Start Followed by a Slow Link (FIG. 9)

Several packets arrive at time instant zero, which can be seen from the fact that base delay increases initially to 1420 ms. This high arrival rate makes the average arrival interval less than 160 ms. After this fast beginning the packets arrive at a rate that is consistently slower than the rate at which packets are created (interval is 240 on average) and, therefore, the arrival interval average begins to increase (it takes some time to converge to the correct value after the fast link condition) and the base delay decreases. When arrival interval average exceeds the creation interval (that is, 160 ms), the base offset becomes greater than zero, resulting in a time scaling ratio larger than 1.00. Therefore the base delay is not decreased as rapidly because the packets are played out slower than originally created. At time instant 5000 ms the arrival interval average has converged so as to be close to the correct value. Due to the use of fixed point arithmetic the base offset value does not exactly correspond to the arrival interval average, and therefore the base delay continues to slowly decrease. However, the sum of the base and reserve delays (the reserve delay is here zero) does not go negative and, therefore, no interruptions are heard. In this case there was no interruption estimate from a previous session and therefore the reserve delay was not used. The next example describes the use of the reserve delay.

Figure 10B:
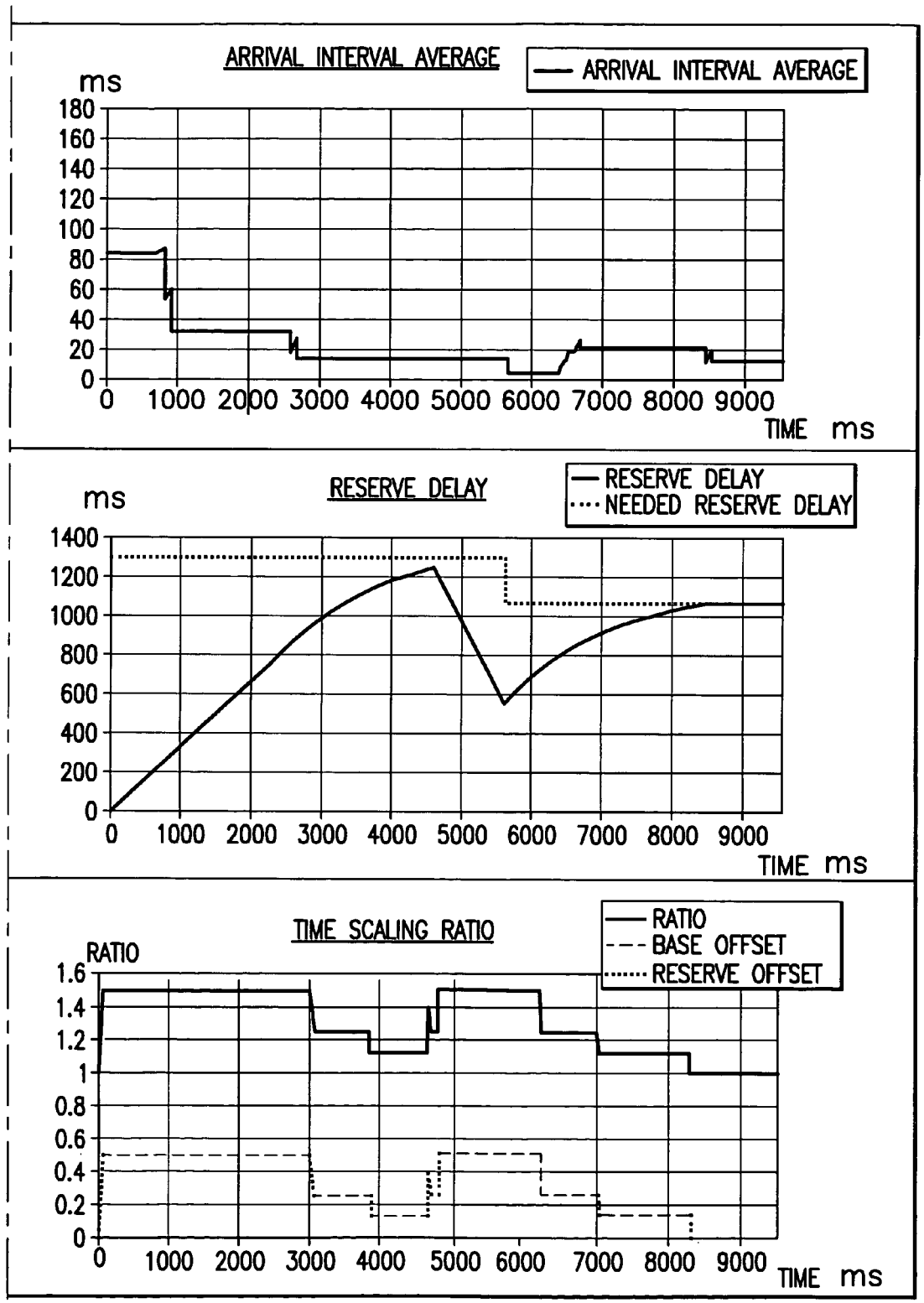
FIG. 10 shows a set of graphs that are useful in explaining a second example of the use of this invention, specifically an example of reserve delay control with a high arrival rate between long pauses (a bursty link).

Example of Reserve Delay Control: High Arrival Rate Between Long Pauses (FIG. 10)

Several packets arrive at time instant zero, and the base delay increases initially to 940 ms. This is followed by a 700 ms pause during which the base delay decreases. It can be seen that the amount of speech samples included in the packets that arrived at the beginning was sufficient to prevent the base delay from going negative during the pause and, therefore, an interruption was not detected. This means that even without the reserve delay, the base delay has a value sufficient to cover this first pause in packet arrivals. After the pause another burst of packets arrives. The arrival interval average is updated only between pauses (the pauses are greater than three times packet creation interval) and therefore obtains values below 160 ms. Because of this the base offset is zero. In previous sessions interruptions were detected and therefore there are interruption estimates in memory from which the needed reserve delay is determined. The reserve offset is set according to the needed reserve delay and, therefore, the time scaling ratio is greater than one. As it can be seen, the reserve delay begins to converge towards the needed reserve delay. An interruption is detected at time instant 4600 ms, where the base delay goes negative. From that instant the reserve delay begins to decrease, because it is now used to cover the interruption. However, at the same time preparations for the next interruption begin, which also provides additional guarding towards the current interruption. After the first interruption is over (at time instant 5600, where a new packet arrives), the reserve delay that is still required to cover possible subsequent interruptions is determined. With this method the buffer underflow was prevented, which can be seen from the fact that sum of base and reserve delays stays positive during the entire session. If in this case traditional fixed delay buffering was used instead, then the interruption of one second would have been heard by the listener, beginning at the time instant where the base delay goes negative (4600 ms in this example).

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent time durations, numbers of samples, buffer sizes, ratios and the like may be attempted by those skilled in the art. In addition, in wireless embodiments of this invention the link can comprise an optical link, and need not comprise an RF link. Also the terminal may have a wired connection to a network. However, all such and similar modifications of the teachings of this invention will still fall within the scope of this invention.

Further, while described above primarily in the context of a mobile telephone, such as a cellular telephone terminal or mobile station 100, this invention can be applied to any terminal that can be connected to a packet switched network, and that is capable of receiving packets and playing out voice (or some other time-ordered content). Thus, these teachings are also applicable to, for example, pocket PCs, laptop PCs and desktop PCs, as well as to personal organizers and personal digital assistants (PDAs) that have voice, or more generally audio, capability. Furthermore, and was also noted above, this invention can be applied to those systems having at least one packet-receiving terminal or device wherein received packets convey time-ordered content that is intended to be presented to a listener or a viewer in a substantially continuous and substantially uniform temporal sequence (i.e., in a manner that is substantially free of interruptions and discontinuities). Voice content and video content are two non-limiting examples of time-ordered content.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
   receiving and buffering data packets that comprise voice information;
   determining a rate at which the received data packets are created through information contained within the received data packets;
   decoding the voice information to obtain decoded voice samples;
   time scaling the decoded voice samples of a frame as a function of packet network conditions by adjusting a buffering delay to provide a substantially continuous output voice signal when the data packets are received at a rate that differs from the rate at which the data packets are created; and
   buffering the decoded voice samples prior to generating the voice playout signal, where
   the buffering delay comprises a base delay that is controlled in a positive sense when the data packets are received at a rate that is slower than the rate at which the data packets are created, and a reserve delay that is managed to provide insurance against an interruption should the base delay become negative.

2. A method as in claim 1, comprising a substantially asynchronous component that determines data packet arrival delays, and a substantially synchronous component that is responsive to the operation of the asynchronous component to control the buffering delay based on time scaling of the decoded voice samples of the frame.

3. A method as in claim 1, where the delay of a packet buffer is a time period that a packet resides in the packet buffer before play-out of the first frame of the packet.

4. A method as in claim 3, further comprising revising estimates of at least one of average arrival interval, interruptions and the base delay as a function of whether an interruption has occurred and, if an interruption has occurred, whether it was the first or a subsequent interruption.

5. A method as in claim 1, where playout of voice frames is initiated after the arrival of a second voice packet.

6. A method as in claim 1, where during a voice session the reserve delay is modified so as to cover an average duration of interruptions.

7. A method as in claim 6, where modifying the reserve delay comprises modifying a playout interval of voice packets by time scaling.

8. A method as in claim 1, further comprising detecting a type of received voice frame as being one of a bad frame, a wait frame and a good frame, and where the timing of an occurrence of the resetting of a base offset value and a reserve offset value is a function at least in part of the detected frame type.

9. An apparatus comprising:
   a receiver configured to receive and buffer data packets that comprise voice information;
   a block configured to determine a rate at which the received data packets are created through information contained within the received data packets;
   a decoder configured to decode the voice information to obtain decoded voice samples;
   a buffer configured to buffer the decoded voice samples prior to generating a voice playout signal; and
   a time scaling function interposed between said decoder and said buffer for time scaling decoded voice samples of a frame by adjusting a buffering delay to provide a substantially continuous output voice signal when the data packets are received at a rate that differs from a rate at which the data packets are created, where the buffering delay comprises a base delay that is controlled in a positive sense when the data packets are received at a rate that is slower than a rate at which the data packets are created, and a reserve delay that is managed to provide an insurance against an interruption should the base delay become negative.

10. An apparatus as in claim 9, comprising a substantially asynchronous component that determines data packet arrival delays, and a substantially synchronous component that is responsive to the operation of the asynchronous component to control the buffering delay based on time scaling of the decoded voice samples of the frame.

11. An apparatus as in claim 9, where a buffering delay of a received packet buffer is a time period that a packet resides in the packet buffer before playout of the first frame of the packet.

12. An apparatus as in claim 11, further comprising a unit to revise estimates of at least one of average arrival interval, interruptions and the base delay as a function of whether an interruption has occurred and, if an interruption has occurred, whether it was the first or a subsequent interruption.

13. An apparatus as in claim 9, where playout of voice frames is initiated after the arrival of a second voice packet.

14. An apparatus as in claim 9, where during a voice session the reserve delay is modified so as to cover an average duration of interruptions.

15. An apparatus as in claim 14, where modifying the reserve delay comprises modifying a playout interval of voice packets by time scaling.

16. An apparatus as in claim 9, further comprising a detector to detect a type of received voice frame as being one of a bad frame, a wait frame and a good frame, and where the timing of an occurrence of the resetting of a base offset value and a reserve offset value is a function at least in part of the detected frame type.

17. A computer readable medium embodied with a computer program for directing a data processor to operate a device by operations comprising:

receiving and buffering data packets that comprise voice information;
determining a rate at which the received data packets are created through information contained within the received data packets;
decoding the voice information to obtain decoded voice samples;
time scaling the decoded voice samples of a frame as a function of packet network conditions by adjusting a buffering delay to provide a substantially continuous output voice signal when the data packets are received at a rate that differs from the rate at which the data packets are created; and
buffering the decoded voice samples prior to generating a voice playout signal, where
the buffering delay comprises a base delay that is controlled in a positive sense when the data packets are received at a rate that is slower than a rate at which the data packets are created, and a reserve delay that is managed to provide an insurance against an interruption should the base delay become negative.

18. A computer readable medium as in claim 17, comprising a substantially asynchronous component that determines data packet arrival delays, and a substantially synchronous component that is responsive to the operation of the asynchronous component to control the Buffering Delay based on Time Scaling of the decoded voice samples of the frame.

19. A computer readable medium as in claim 17, where the delay of a packet buffer is a time period that a packet resides in the packet buffer before playout of the first frame of the packet.

20. A computer readable medium as in claim 19, further comprising revising estimates of at least one of average arrival interval, interruptions and the base delay as a function of whether an interruption has occurred and, if an interruption has occurred, whether it was the first or a subsequent interruption.

21. A computer readable medium as in claim 17, where playout of voice frames is initiated after the arrival of a second voice packet.

22. A computer readable medium as in claim 17, where during a voice session the reserve delay is modified so as to cover an average duration of interruptions.

23. A computer readable medium as in claim 22, where modifying the reserve delay comprises modifying a playout interval of voice packets by time scaling.

24. A computer readable medium as in claim 17, further comprising detecting a type of received voice frame as being one of a bad frame, a wait frame and a good frame, and where the timing of an occurrence of the resetting of a base offset value and a reserve offset value is a function at least in part of the detected frame type.

25. A computer readable medium as in claim 17, where said device comprises a receiver for coupling to the packet switched network through a wireless link.

26. A computer readable medium as in claim 17, where said device comprises a receiver for coupling to the packet switched network through a wired link.

27. A computer readable medium as in claim 17, where said device comprises a cellular telephone having an RF receiver for coupling wirelessly to the packet switched network.

28. A computer readable medium embodied with a computer program for directing a data processor to operate a device by operations comprising:

receiving and buffering data packets that comprise information that is representative of time-ordered content that is intended to be presented to a person in a substantially continuous and substantially uniform temporal sequence;
determining a rate at which the received data packets are created through information contained within the received data packets;
decoding the information from the received data packets to obtain decoded samples; and
buffering the samples prior to generating a playout signal, where
the samples of a frame are time scaled as a function of packet network conditions to provide a substantially continuous output signal when the data packets are received at a rate that differs from a rate at which the data packets are created, where the samples are time scaled to adjust a base delay that is controlled in a positive sense when the data packets are received at a rate that is slower than a rate at which the data packets are created, and a reserve delay that is managed to provide insurance against an interruption in presenting the time ordered content should the base delay become negative.

29. A computer readable medium as in claim 28, comprising a substantially asynchronous component that determines data packet arrival delays, and a substantially synchronous component that is responsive to the operation of the asynchronous component to control the value of the base delay and the reserve delay.

30. A computer readable medium as in claim 28, further comprising revising estimates of at least one of average arrival interval, interruptions and the base delay as a function of whether an interruption has occurred and, if an interruption has occurred, whether it was the first interruption or a subsequent interruption.

31. A computer readable medium as in claim 28, further comprising detecting a type of received frame as being one of a bad frame, a wait frame and a good frame, and where timing of an occurrence of the resetting of a base offset value and a reserve offset value is a function at least in part of the detected frame type.

32. An apparatus comprising:
a receiver configured to receive data packets that comprise information that is representative of time-ordered content that is intended to be presented to a person in a substantially continuous and substantially uniform temporal sequence;

a decoder to decode the information to obtain samples;

a determiner configured to determine a rate at which the received data packets are created through information contained within the received data packets;

a buffer for storing the samples prior to generating a playout signal; and a scaler for time scaling samples of a frame as a function of packet network conditions to enable changing the playout rate to provide a substantially continuous output signal when the data packets are received at a rate that differs from a rate at which the data packets are created, said scaler operating with a base delay that is controlled in a positive sense when the data packets are received at a rate that is slower than a rate at which the data packets are created, and a reserve delay that is managed to provide insurance against an interruption should the base delay become negative.

33. An apparatus as in claim 32, where said apparatus comprises a substantially asynchronous component that determines data packet arrival delays, and a substantially synchronous component that is responsive to the operation of the asynchronous component to control operation of the scaler.

34. An apparatus as in claim 32, further comprising an estimator operable to revise estimates of at least one of average arrival interval, interruptions and the base delay as a function of whether an interruption has occurred and, if an interruption has occurred, whether it was the first interruption or a subsequent interruption.

35. An apparatus as in claim 32, further comprising a detector to detect a type of received frame as being one of a bad frame, a wait frame and a good frame, and where timing of an occurrence of the resetting of a base offset value and a reserve offset value is a function at least in part of the detected frame type.

36. An apparatus as in claim 32, where the data packets comprise Voice over IP packets.

37. An apparatus as in claim 32, where said apparatus comprises a cellular telephone having Voice over IP capabilities.

38. A computer readable medium embodied with a computer program for directing a data processor to operate a device executing operations comprising:

receiving signal samples containing packets from a network;

determining a rate at which the received data packets are created through information contained within the received data packets; and adjusting a buffering delay parameter according to an arrival interval of packets and according to playout interruptions, where the value of the buffering delay parameter is a function of a difference between a packet's playout point and the arrival time of the packet, and is a combination of a base delay and a reserve delay;

where the base delay represents an amount of buffering delay that is introduced due to the arrival rate of packets such that if packets arrive faster than they are created, and the packets are played out at the same rate as they are created, the base delay is increased, where the base delay introduced during a time that the packets arrive faster than they are created is consumed during a pause in packet arrival to avoid a playout interruption; and where the reserve delay represents an additional delay used in anticipation of, and as insurance against, a playout interruption that would occur when the base delay becomes negative.

39. A computer readable medium as in claim 38, where the packets received from the network comprise Voice over IP packets.

40. A computer readable medium as in claim 38, where said device comprises a cellular telephone.

41. A computer readable medium as in claim 38, where the base delay is evaluated for a last frame of a packet having a largest packet sequence number that has thus far been received.

42. A computer readable medium as in claim 38, where base delay modifications are related to a packet arrival interval average and are embedded within a base virtual playpoint variable that represents a playout point that corresponds to one that would have been used for a first arrived packet in a current evaluation period of the base delay, if the remainder of the packets would have been played out at regular intervals, while still resulting in the same value of the base delay as with an actual irregular playout of packets.

43. A computer readable medium as in claim 42, where the base delay is evaluated to be equal to a base virtual playpoint+creation interval*(largest arrived sequence number−first sequence number for the base)+creation interval-1-current time.

44. A computer readable medium as in claim 43, where an evaluation period of the base delay begins at a time instant where a first packet arrives after the base delay has gone negative.

45. A computer readable medium as in claim 42, where the base virtual playpoint is first updated by adding a virtual playpoint change to a current base virtual playpoint value, and setting the virtual playpoint change to zero.

* * * * *